United States Patent

[11] 3,544,774

[72] Inventor Janez Peklenik
6 Kingsway Drive, Kings Norton, Birmingham, England
[21] Appl. No. 496,856
[22] Filed Oct. 18, 1965
[45] Patented Dec. 1, 1970
[32] Priority Oct. 20, 1964
[33] Germany
[31] No. P35309

[54] APPARATUS FOR DETERMINING CHARACTERISTIC MAGNITUDES IN STOCHASTIC PROCESSES
2 Claims, 6 Drawing Figs.
[52] U.S. Cl. .................................................. 235/151.13,
73/105, 235/92, 235/197
[51] Int. Cl. .................................................. G01b 7/34,
G06g 7/48
[50] Field of Search .......................................... 235/151.13,
193, 92; 340/213(Q); 73/(Inquired)

[56] References Cited
UNITED STATES PATENTS
| | | | |
|---|---|---|---|
| 2,679,639 | 5/1954 | Locher ........................... | 340/213 |
| 3,082,949 | 3/1963 | Barker ............................ | 235/151 |
| 3,146,344 | 8/1964 | Palmer ........................... | 235/151.13 |
| 3,147,370 | 9/1964 | Lowman ......................... | 235/151.13 |
| 3,260,838 | 7/1966 | Anderson ....................... | 235/92 |
| 3,339,063 | 8/1967 | Norsworthy .................... | 235/151.13 |

*Primary Examiner*—Eugene G. Botz
*Assistant Examiner*—Felix D. Gruber
*Attorney*—Holman, Glascock, Downing & Seebold

ABSTRACT: An apparatus is provided for determining a statistic characteristic magnitude of a fluctuating parameter by multiplying together signals derived from (a) a device which calculates the standard deviation of the fluctuating parameter, (b) a counter which records the number of occasions on which the parameter exceeds a predetermined value, and (c) a function generator which produces a constant signal which is a known function of the predetermined value.

PATENTED DEC 1 1970

APPARATUS FOR DETERMINING CHARACTERISTIC MAGNITUDES IN STOCHASTIC PROCESSES

This invention relates to apparatus for testing a process or condition to obtain a characteristic statistical magnitude thereof. The invention is particularly applicable to the testing of technical surfaces, but can also be applied to the testing of processes in which temperatures, voltages or other parameters fluctuate and to the testing of conditions as the thickness of sheet metal other the surface irregularities and the standard deviation of the depths of the or the diameter of wire yarn.

In most such processes or conditions the fluctuation of the parameter concerned with time or with another parameter, such as length, are in normal distribution. This is particularly so in the case of surfaces. Attempts so far made to provide a satisfactory statistical characteristic magnitude for surfaces have not been altogether successful. The easily obtained magnitudes, such as the mean depth of the surface irregularities and the standard deviation of the depths of the irregularities, do not characterise a surface sufficiently accurately, so that these values could be the same for quite different surfaces.

Figure 1:
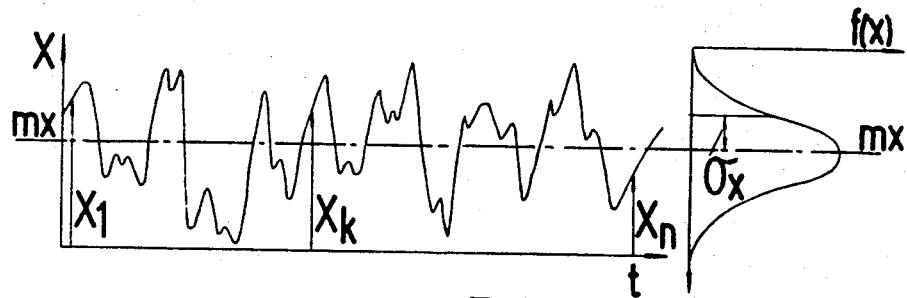
FIG. 1, 2a and 2b are graphs indicating traces of surfaces.

FIG. 1 is referred to firstly to explain the terminology employed. The means value $m_x$ of the ordinate displays an irregular variation with the time T being the time for a tracing stylus to traverse the surface as shown in the abscissa. The values of the ordinates $x_1, x_2, x_3 ..... x_i$ are in normal distribution, the the distribution curve being shown at the right-hand end of FIG. 1. It will be appreciated that the mean ordinate $m_x$ and the standard deviation $\sigma_x$ are dependent purely on the ordinates and in no way upon the rates of change of the ordinates with the abscissa. Thus, the traces shown in FIGS. 2a and 2b, which represent totally different surfaces, have the same values for $m_x$ and $\sigma_x$.

Theoretically the so-called correlation function provides an exact characterisation of a process or condition with random fluctuations.

Figure 2A:
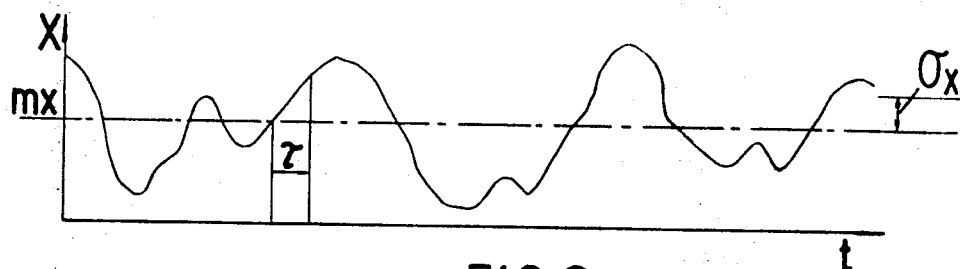
Figure 2B:
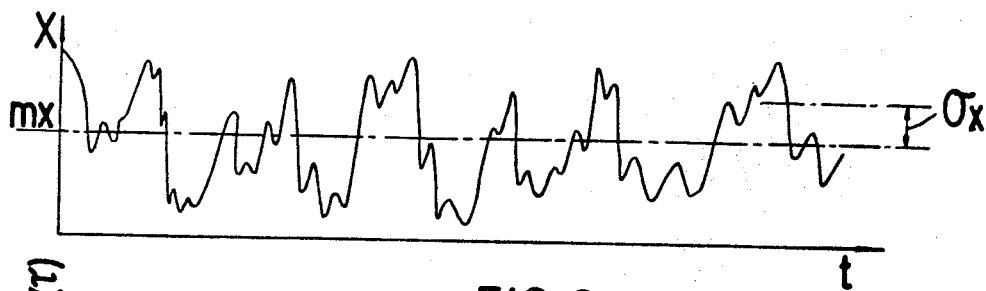
Figure 3:
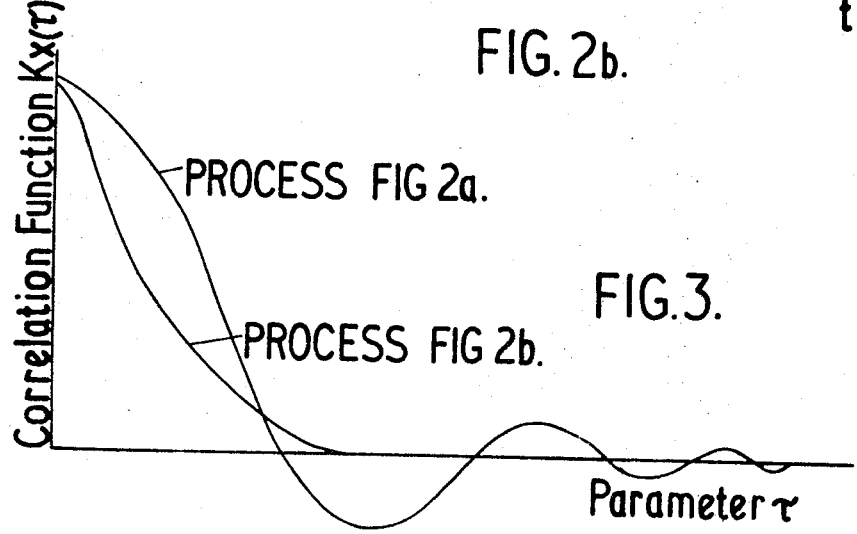
FIG. 3 is a graph indicating the correlation functions for traces of FIG. 2a and 2b.

FIG. 3 shows the graphs the correlation functions for the traces of FIGS. 2a and 2b. The plotting of the correlation functions is, however, extremely difficult and time consuming, so that, for practical purposes, the correlation function is not suitable for characterising a technical surface.

The present invention rests on two statistical principles. The first of these is that there is a definite relationship between the correlation function of a normal distribution and the slope dispersal $D_{\dot{x}}$ being the mean of the squares of the slopes of the trace, ignoring changes of sign. This relationship is as follows:

$$D_{\dot{x}} = \frac{-d^2 K(r)}{dr^2}$$

The second principle is that the standard deviation $\sigma_{\dot{x}}$ for a given ordinate level can be determined as the product of the standard deviation $\sigma_x$ of the ordinates, the number $r_a$ of intersections of, with curve of the fluctuations with a given level and a constant $C_a$ determinable from the position of the level and the known form of the distribution.

It is thus an object of the present invention to provide apparatus for determining a statistical characteristic magnitude which characterises a process or condition more precisely than the previously known characteristic magnitudes and which is very much simpler than the computation equipment required for computing the correlation function.

Apparatus in accordance with the invention comprises a measuring device which produces an electrical signal fluctuating in time in accordance with the variations of said first parameter with said second parameter; means connected to said measuring device to receive said electrical signal and sensitive to said signal for producing a standard deviation signal dependent on the standard deviation of the first parameter, a Schmitt trigger connected to said measuring device and arranged to be fired whenever the first-mentioned signal increases above a predetermined value of the first parameter, adjusting means for the Schmitt trigger for adjusting said predetermined value, a counter connected to the Schmitt trigger for recording the number of firings of the Schmitt trigger, means for producing a constant signal dependent on said predetermined value, and a multiplying device into which the standard deviation signal, the constant signal and a signal derived from the counter are fed to produce the output signal which is proportional to the product of the standard deviation signal, said constant signal and said signal derived from the counter, the output signal representing the standard deviation of the slope of said first parameter at said predetermined value.

It should be mentioned now for the sake of completeness that the determination of the magnitude $\sigma_{\dot{x}}$ as the product $\sigma_x \cdot r_a \cdot C_a$ is satisfactory in theory. Thus it can be shown that the mean number of intersection points, per unit length, of the process curve with a given level is equal to the intersection probability:

$$(1) \qquad r_a' = \frac{r_a}{L} = \int_0^\infty \dot{x} \cdot f(a, \dot{x}) d\dot{x} = p(a)$$

Both the ordinates $x$ of the process and also their first derivative $\dot{x}$ are dependent random variables. Their distributions are normal distributions. For the two-dimensional normal distributions for $x$ and $\dot{x}$ the following relationship holds:

$$(2) \qquad f(x, \dot{x}) = \frac{1}{\sigma_x \cdot \sqrt{2\pi}} \cdot e^{\frac{-(x-m_x)^2}{2\sigma_x^2}} \cdot \frac{1}{\sigma_{\dot{x}} \cdot \sqrt{2\pi}} \cdot e^{\frac{-\dot{x}^2}{2\sigma_{\dot{x}}^2}}$$

By substituting this equation in equation (1) the following expression for the number of intersections per unit lengths can be obtained:

$$r_a' = \frac{\sigma_{\dot{x}}}{2\pi\sigma_x} \cdot e^{\frac{-(a-m_x)^2}{2\sigma_x^2}}$$

from which it follows:

$$\sigma_{\dot{x}} = \sigma_x \cdot r_a \cdot C_a \text{ with } C_a = 2\pi \cdot e^{\frac{(a-m_x)^2}{2\sigma_x^2}}$$

In the following table some values for the constant $C_a$ for various level heights are given:

| Level $a$: | $C_a$ |
| --- | --- |
| $M_x$ | $2\pi$ |
| $M_x + \sigma_x$ | 10.3 |
| $M_x - \sigma_x$ | 10.3 |
| $M_x + 2\sigma_x$ | 46 |
| $M_x - 2\sigma_x$ | 46 |

Figure 4:
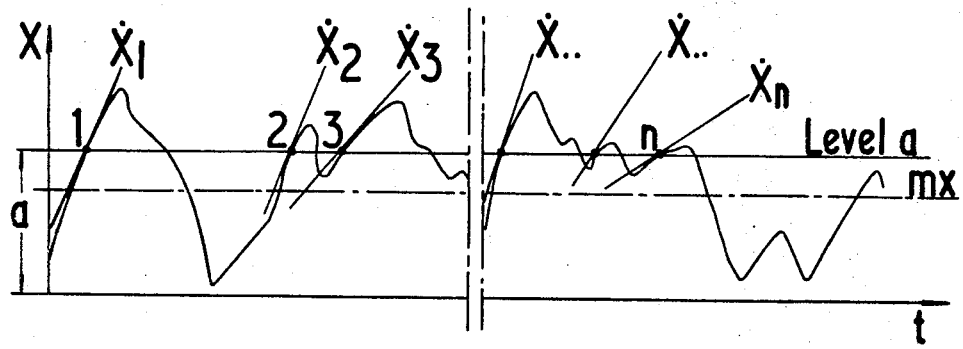
FIG. 4 is a graph indicating a surface trace and the tangents at an intersect level.

The actual physical meaning of the standard deviation $\sigma_{\dot{x}}$ will be appreciated by referring to the graph shown in FIG. 4. Here the ordinate level $a$ has been superimposed on the trace and tangents have been drawn in where rising portions of the trace intersect level $a$. It is not necessary to consider the other points where the trace intersects level $a$ since these are the same in the statistical sense. The slopes $\dot{x}$ vary about a mean slope $m_{\dot{x}}$. If the trace is relatively even then the slope dispersal $D_{\dot{x}}$ will be small. If, on the other hand, the trace is uneven the slope dispersal $D_{\dot{x}}$ would have a higher value.

Figure 5:
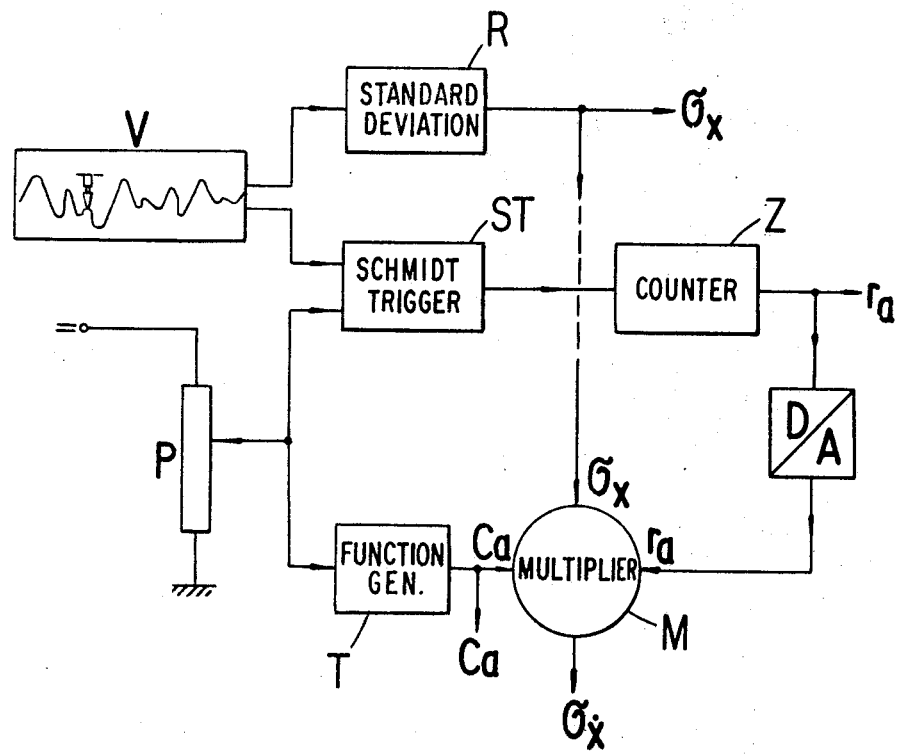
FIG. 5 is a block diagram of the invention.

The drawing FIG. 5 which shows a block diagram of a device in accordance with the invention for determining the value $\sigma_x$ for example for ground surfaces. A known type of measuring device V with a fine feeler is used to generate an electrical analog dependent on the displacement of the feeler by the surface, as the feeler is drawn at a steady speed across the surface under investigation. The signals thus produced fluctuate in time in a predetermined relationship to the variations of the displacement of the feeler with the position of the feeler on the surface. The electrical signal produced is fed to a commercially available device R which, for example by means of electric integration, continuously determines the value $\sigma_r$ of the fluctuation. The device R can also be a part of the measurement or feeling device.

The signal from the measuring device V is also fed to a Schmitt-trigger ST to fire the latter whenever the signal from the device V rises above a predetermined value as set by a potentiometer P or the like. The pulses produced by the Schmitt-trigger ST are counted per unit time by a counter Z. The counter Z has its output connected to a D/A converter which produces an electrical signal of magnitude directly proportional to the count state of the counter after each unit of time.

The potentiometer P controls the signal from a function generator T programed for the particular class of work to be undertaken to produce a constant output determined by the setting of the potentiometer P. Thus for ground surfaces the generator T is programed to produce an output varying with the chosen level $a$ according to the table of values for $C_a$ given above, bearing in mind that for the class of ground surfaces to be tested the values of $\sigma_r$ will not vary significantly. For testing machined or polished surfaces the generator T would be required to take into account the different values of $\sigma_r$.

Finally, the apparatus includes a multiplier M of any convenient type which receives signals from the standard deviation device R from the digital to analog converter D/A and from the function generator T and produces an output signal proportional to the product of the three incoming signals. The output is displayed in any convenient way for direct reading of the value of $\sigma_{\dot{x}}$ for the chosen value of $a$.

I claim:

1. Apparatus for use in the testing of a process or condition in which a first parameter is subject to random fluctuations in its dependency on a second parameter to derive an electrical output signal representative of a characteristic statistical magnitude of the process or condition, said apparatus comprising a measuring device which produces an electrical signal fluctuating in time in accordance with the variations of said first parameter with said second parameter; means connected to said measuring device to receive said electrical signal and sensitive to said signal for producing a standard deviation signal dependent on the standard deviation of the first parameter, a Schmitt trigger connected to said measuring device and arranged to be fired whenever the first mentioned signal increases above a predetermined value of the first parameter, adjusting means for the Schmitt trigger for adjusting said predetermined value, a counter connected to the Schmitt trigger for recording the number of firings per unit time of the Schmitt trigger, means for producing a constant signal dependent on said predetermined value, and a multiplying device into which the standard deviation signal, the constant signal and a signal derived from the counter are fed to produce the output signal which is proportional to the product of the standard deviation signal, said constant signal and said signal derived from the counter, the output signal representing the standard derivation of the slope of said first parameter at said predetermined value.

2. Apparatus as claimed in claim 1 further comprising a digital/analog converter whereby said signal derived from the counter is produced for feeding to the multiplying device.